United States Patent [19]

Butzin et al.

[11] Patent Number: 5,070,622

[45] Date of Patent: Dec. 10, 1991

[54] DIMENSION MEASURING DEVICE

[75] Inventors: Donald F. Butzin, Wilmington; Harold B. King, Jr., Wrightsville Beach, both of N.C.

[73] Assignee: General Electric Company, San Jose, Calif.

[21] Appl. No.: 662,694

[22] Filed: Mar. 1, 1991

[51] Int. Cl.$^5$ .......................... G01B 7/02; G01B 7/12
[52] U.S. Cl. ........................................ 33/793; 33/502; 33/784; 324/716; 338/99
[58] Field of Search ................ 33/784, 788, 793, 797, 33/502; 324/699, 716; 338/99, 112, 115, 96

[56] References Cited

U.S. PATENT DOCUMENTS

| 1,683,059 | 9/1928 | Van Deventer | 338/96 |
| 2,435,254 | 2/1948 | Ramberg | 338/96 |
| 2,508,419 | 5/1950 | Ramberg | 33/788 |
| 3,239,938 | 3/1966 | Kaercher | 33/793 |
| 3,350,940 | 11/1967 | Stone | 73/301 |
| 3,729,829 | 5/1973 | Lange et al. | 33/788 |
| 3,958,337 | 5/1976 | Anichini | 33/788 |
| 4,052,901 | 10/1977 | Bjork | 73/313 |
| 4,237,612 | 12/1980 | Christian et al. | 33/784 |
| 4,279,079 | 7/1981 | Gamberini et al. | 33/797 |
| 4,294,015 | 10/1981 | Drouin et al. | 33/788 |
| 4,928,342 | 5/1990 | Donaldson | 33/784 |

FOREIGN PATENT DOCUMENTS

| 476818 | 2/1972 | Japan | 338/112 |
| 82335 | 9/1919 | Switzerland | 338/96 |

Primary Examiner—Thomas B. Will
Attorney, Agent, or Firm—Robert R. Schroeder

[57] ABSTRACT

To measure the gaps between fuel rods in a fuel assembly, a feeler gauge is provided with a pair of resilient arms having elongated electrical resistance strips carried by their confronting surfaces and extending from terminations adjacent the free ends of the arms through a contact point of electrical inter-engagement. The strip terminations are wired into a metering circuit including a current source and an ammeter. When the arm free ends are positioned in a rod gap, the position of the contact point relative to the strip terminations determines the magnitude of resistance included in the metering circuit, and the meter registers the gap dimension.

9 Claims, 2 Drawing Sheets

DIMENSION MEASURING DEVICE

The present invention relates to dimension measuring devices and particularly to a feeler gauge with remote dimension reading capability.

BACKGROUND OF THE INVENTION

There are many situations where a dimension measurement is desired at locations that are difficult to access because of interfering structure or hazardous due to hostile environment. One situation that poses both problems is the measurement of gap dimensions within nuclear reactor fuel bundles. That is, it is important to measure the gaps between fuel rods of fuel bundles for both pre-irradiation and post-irradiation conditions. In the latter case, the rod-to-rod gap dimensions must be obtained under water in the presence of extremely high radiation fields.

Presently, rod gap measurements are made using a device known in the industry as a "SULO" probe available from Intricate Machinery of Attleboro, Mass. This probe includes a pair of thin stainless-steel leaf springs with strain gauges sandwiched therebetween. The electrical signals produced by the strain gauges are proportional to the flexure of the leaf springs as they conform to the rod gap and thus can be processed to provide a remote indication of the rod gap dimension.

The SULO probe, while capable of providing rod gap readings of acceptable accuracy, is relatively expensive, requires frequent recalibration, and has a short service life.

SUMMARY OF THE INVENTION

In accordance with the present invention, there is provided an improved feeler gauge which is compact in size and thus capable of reaching into tight quarters to access difficult locations where dimensional measurements of objects or gaps between objects are sought. Moreover, the feeler gauge of the present invention is suitable for pole mounting permitting manipulation into a hostile environment from a safe vantage point where electrical signals are brought to a dimension-reading, electrical metering device.

To this end, the feeler gauge of the present invention includes a pair of resilient arms affixed in juxtaposition adjacent corresponding one ends and having spaced free ends. The juxtaposed one ends of the arms are carried at the end of an elongated pole or wand. Exposed at the confronting surfaces of the arms are respective electrical resistance elements extending from terminations adjacent the arm free ends toward the juxtaposed one ends through an intermediate contact point of electrical inter-engagement. The resistance element terminations are wired through or along the arms and pole into a remote metering circuit including a current source and a current meter. When the arm free ends assume a measurement position, the arms flex accordingly to change the contact point position relative to the resistance element terminations. This has the effect of changing the electrical resistance presented to the metering circuit, and the meter responds to this resistance change to provide a reading in dimensional units of the measurement sought. Depending upon the configuration of the arm free ends, the feeler gauge is adapted to measure an inside dimension, such as a gap between objects, hole diameter, etc., or outside dimensions, such as object thickness, diameter, etc.

BRIEF DESCRIPTION OF THE DRAWINGS

For a full understanding of the nature and objectives of the present invention, reference may be had to the following Detailed Description taken in connection with the accompanying drawings, in which.

Like reference numerals refer to corresponding parts throughout the several views of the drawing.

DETAILED DESCRIPTION

Figure 1:
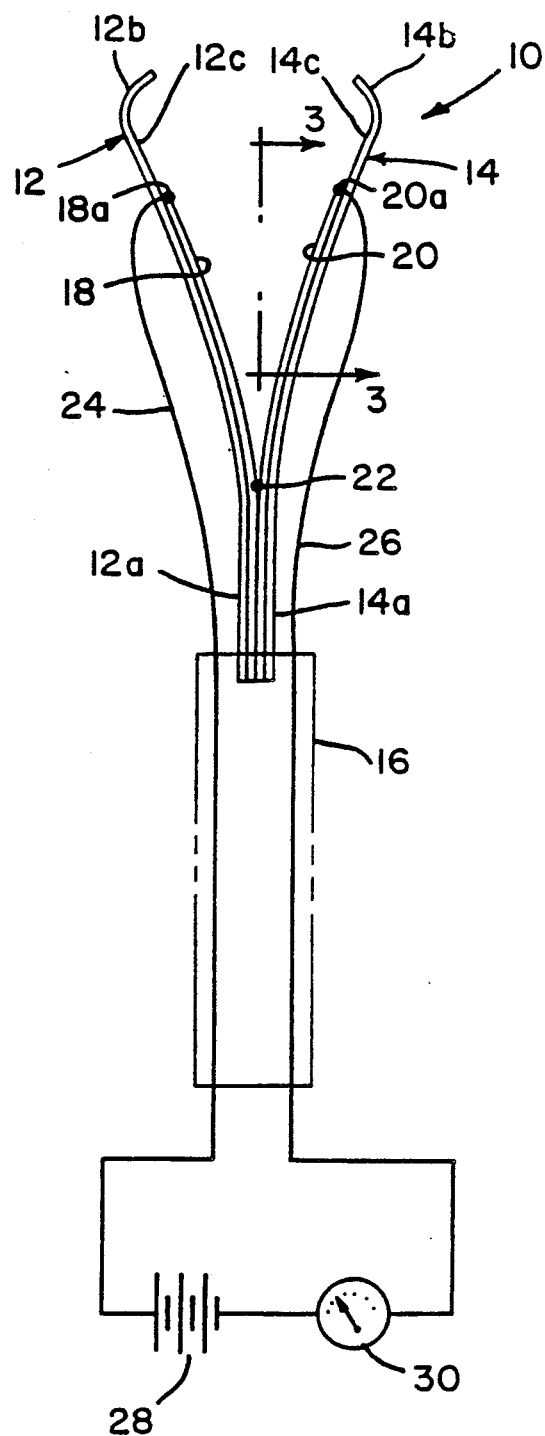
FIG. 1, is a plan view, partially in diagrammatic form, of a feeler gauge constructed in accordance with an embodiment of the present invention.
Figure 3:
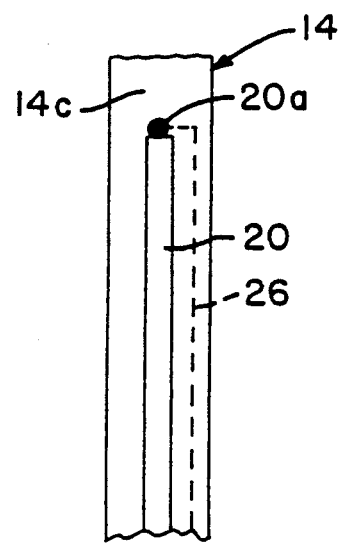
FIG. 3 is a sectional view taken along line 3—3 of FIG. 1.

In the embodiment of the invention seen in FIG. 1, a feeler gauge generally indicated at 10, includes a pair of resilient arms, generally indicated at 12 and 14, having corresponding one end portions 12a and 14a in juxtaposed relation and affixed at their terminations to an end of an elongated pole or wand 16. The arms flare outwardly to dispose free ends or feeler tips 12b and 14b in quiescent, spaced apart relation. As also seen in FIG. 3, applied to the confronting surfaces 12c and 14c of the arms are elongated strips 18 and 20 of electrical resistance material extending from terminations 18a and 20a adjacent feeler tips 12b and 14b to at least beyond the point where the arms merge into juxtaposed relation. At the point of merger, the resistance strips are in electrical contacting engagement at an initial, quiescent contact point 22. The arms 12 and 14 may be fabricated from metallic leaf spring stock with at least their confronting surfaces 12c and 14c coated with an insulative film to electrically isolate the resistance strips from the arms. Alternatively, the arms may be formed of a resilient plastic material. The resistance strips may consist of precision film resistors or other types of resistance elements whose resistance predictably varies as a function of length.

Figure 4:
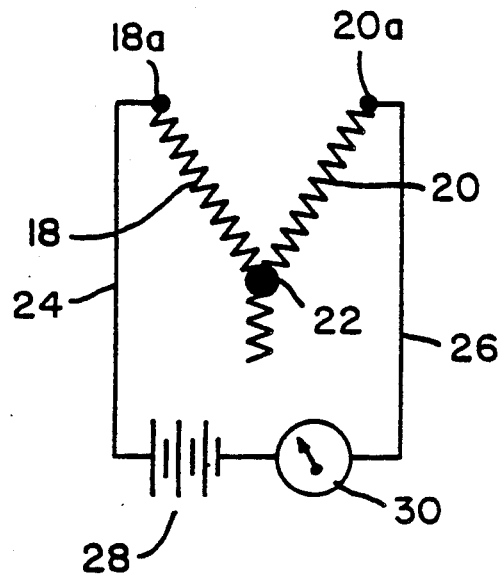
FIG. 4 is a schematic diagram of the electrical circuit portion of the feeler gauge in its quiescent condition of FIG. 1.

The resistance strip terminations 18a and 20a are connected by wires 24 and 26, which are routed along the arms and through or along wand 16, into a remote metering circuit including a current source, such as a battery 28, and a metering device, such as an amp meter. From the circuit schematic of FIG. 4, it is seen the lengths of the resistance strips between contact point 22 and their terminations 18a, 20a are connected in series with the battery and meter.

Figure 2:
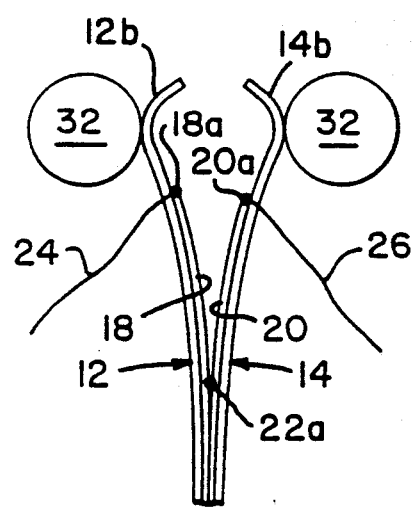
FIG. 2, is a fragmentary plan view of the feeler gauge of FIG. 1, positioned to measure the gap between two objects.
Figure 5:
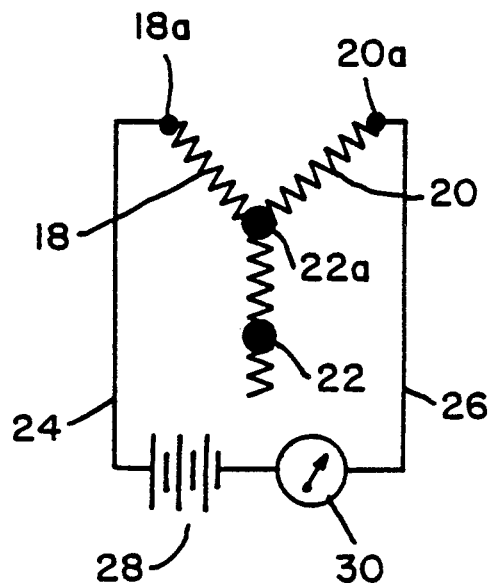
FIG. 5 is a schematic diagram of the electrical circuit portion of the feeler gauge in its gap measuring condition of FIG. 2.

To measure an inside dimension, such as the gap between fuel rods 32 seen in FIG. 2, wand 16 is manipulated to position feeler tips 12b and 14b in the inter-rod gap, as illustrated. Arms 12 and 14 are flexed toward each other, causing contact point 22 between resistance strips 18 and 20 to shift outwardly to a new position 22a closer to strip terminations 18a and 20a, as illustrated in FIG. 5. This is seen to reduce the lengths of the resistance strips between their terminations and the new contact point and to proportionately reduce the electrical resistance in the metering circuit. The current flowing in the metering circuit increases to a higher level representative of the gap dimension. Meter 30, calibrated in dimensional units, responds to this current level to provide a direct reading of the gap dimension. Preferably, this meter is of the type capable of holding a maximum reading, thus enabling a gap measurement to be taken simply by passing the feeler tips through the inter-rod gap.

Figure 6:
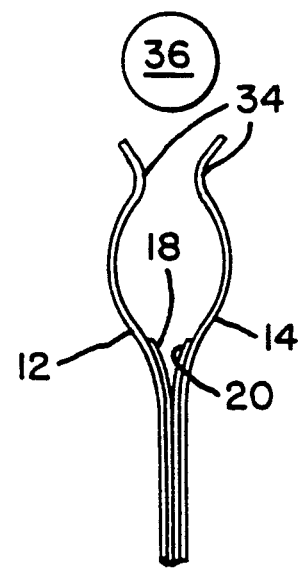
FIG. 6 is a fragmentary plane view of a feeler gauge constructed in accordance with an alternative embodiment of the invention.

The feeler tips 12b and 14b of feeler gauge 10 are bowed outwardly to provide a configuration appropriate for taking inside dimensions, as illustrated in FIG. 2. It will be appreciated that the feeler tips can be bowed inwardly, as illustrated at 34 in FIG. 6, to provide a configuration suitable for taking outside dimensions, such as the diameter or thickness of an object 36.

From the foregoing Detailed Description it is seen that the objectives of the present invention are effectively attained, and, since certain changes may be made in the constructions set forth without departing from the scope of the invention, it is intended that all matters of detail be taken as illustrative and not in a limiting sense.

Having described the invention, what is claimed as new and desired to secure by Letters Patent is:

1. A feeler gauge comprising, in combination:
   A. first and second elongated, resilient arms having corresponding one ends affixed in juxtaposition and corresponding free ends disposed in spaced relation to present respective first and second arm surfaces in confronting relation;
   B. first electrical resistance means exposed at said first arm surface and extending from a first termination adjacent said free end toward said one end of said first arm;
   C. second electrical resistance means exposed at said second arm surface and extending from a second termination adjacent said free end toward said one end of said second arm, said first and second resistance means being disposed in electrical interengagement at a contact point spaced from said first and second terminations; and
   D. a metering circuit including a current source and a meter electrically connected to said first and second terminations;
   E. whereby, when said arm free ends assume measurement-taking relative positions, the position of said contact point relative to said first and second terminations changes to correspondingly change the electrical resistance of said first and second electrical resistance means included in said metering circuit, said meter responding to the electrical resistance change to provide a measurement reading.

2. The feeler gauge defined in claim 1, wherein said first and second resistance means are in the form of first and second elongated strips whose resistance predictably varies as a function of length.

3. The feeler gauge defined in claim 2, wherein the lengths of said first and second strips between said contact point and said first and second terminations are connected in series into said metering circuit.

4. The feeler gauge defined in claim 3 wherein said meter is an ammeter.

5. The feeler gauge defined in claim 4, wherein said ammeter is calibrated in dimensional units.

6. The feeler gauge defined in claim 3, which further includes an elongated wand mounting said first and second arms at said one ends thereof.

7. The feeler gauge defined in claim 6, wherein said meter is located remotely from said arm free ends.

8. The feeler gauge defined in claim 3, wherein said arm free ends are configured for taking inside measurements.

9. The feeler gauge defined in claim 3, wherein said arm free ends are configured for taking outside measurements.

* * * * *